UNITED STATES PATENT OFFICE 2,437,182

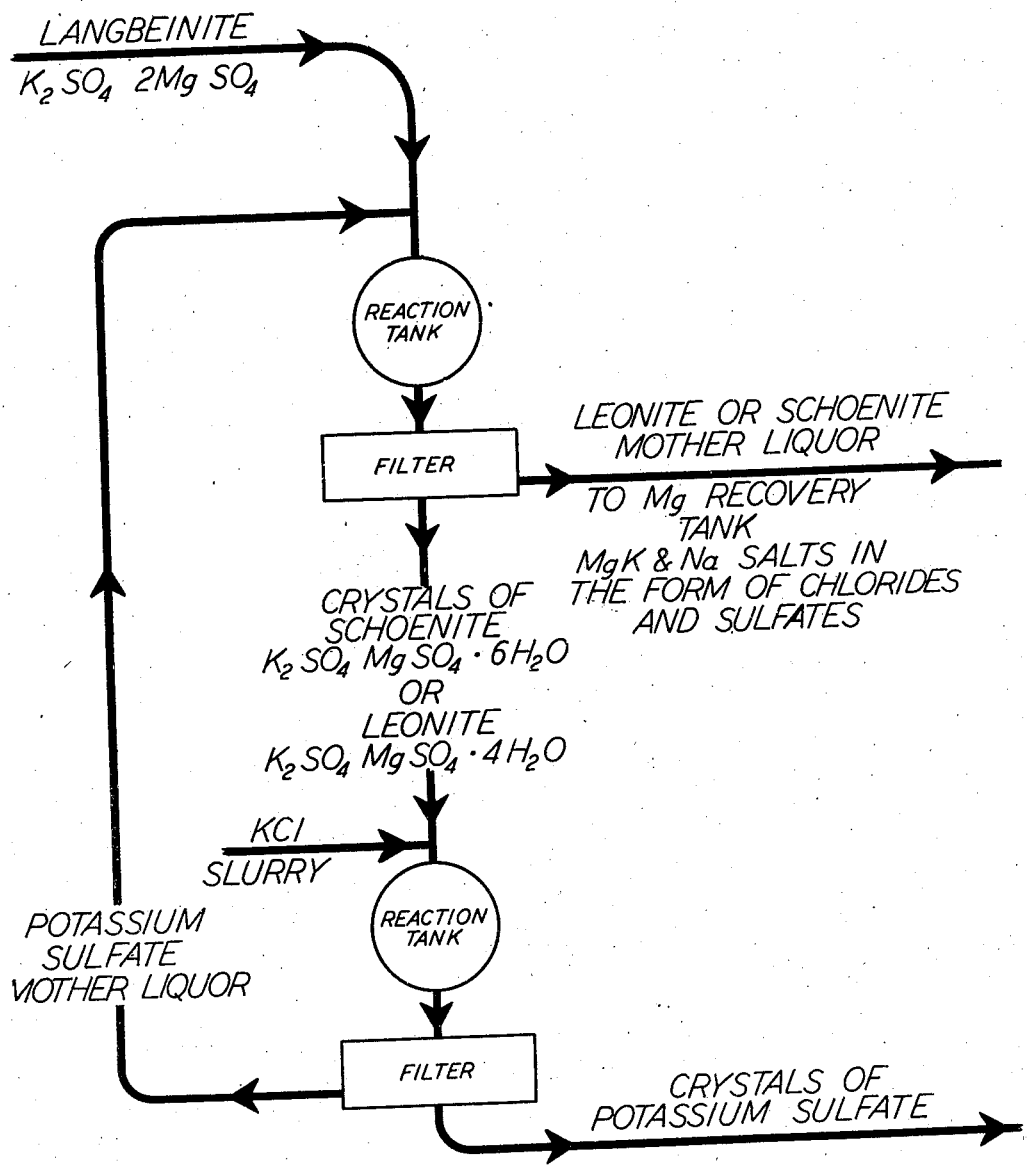

POTASSIUM SULPHATE MANUFACTURE

James A. Barr, Evanston, Ill., and William A. Smith, Carlsbad, N. Mex., assignors to International Minerals & Chemical Corporation, a corporation of New York Application April 15, 1943, Serial No. 483,100

1 Claim. (Cl. 23—121)

This invention relates to the manufacture of potassium sulphate from minerals containing compounds of potassium. It is of particular value in connection with the production of potassium sulphate from the minerals sylvite (KCl) and langbeinite ($K_2SO_4 \cdot 2MgSO_4$). The invention involves a treatment the final reactive step in which includes the use of potassium chloride (KCl) to convert an intermediate hydrated potassium magnesium sulphate, e. g., schoenite ($K_2SO_4 \cdot MgSO_4 \cdot 6H_2O$) or leonite ($K_2SO_4 \cdot MgSO_4 \cdot 4H_2O$)

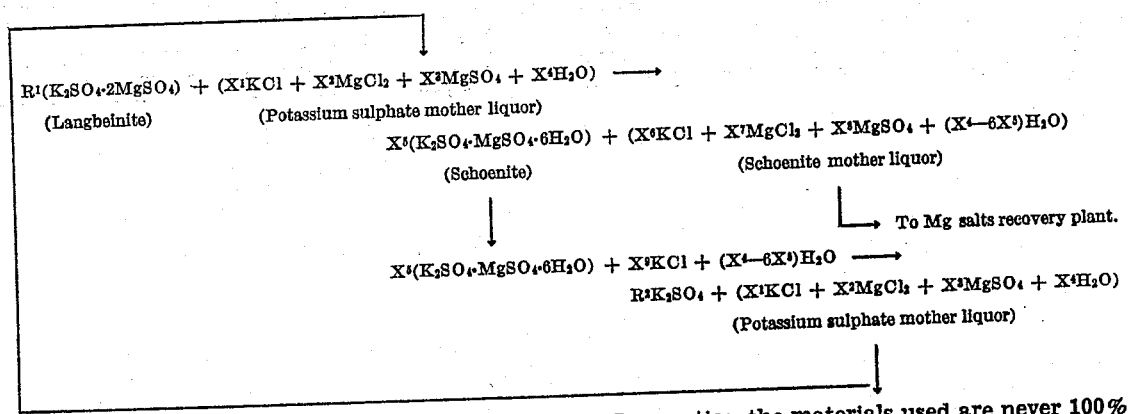

into potassium sulphate ($K_2SO_4$).

According to the general method employed, a mineral containing magnesium sulphate, e. g., langbeinite, is treated in the mother liquor which remains after the final reaction step of the process when the crystals of potassium sulphate have been separated from said mother liquor in which such crystals have been formed. This initial reaction between the magnesium salt and the returned mother liquor (which contains chlorides and sulphates of magnesium and potassium in solution) may be termed a hydration step, the effect of which is to form an intermediate product, e. g., a potassium magnesium sulphate such as schoenite ($K_2SO_4 \cdot MgSO_4 \cdot 6H_2O$) or leonite ($K_2SO_4 \cdot MgSO_4 \cdot 4H_2O$), in the liquor. The reaction is exothermic, sufficient heat being evolved to effect a material rise in the temperature of the liquor. The intermediate product resulting from the hydration step is separated mechanically from the liquor, e. g., by centrifuging.

The filtrate or intermediate mother liquor remaining after separation of the schoenite crystals contains magnesium sulphate, magnesium chloride and potassium chloride in solution and may be saved and treated in any suitable equipment or by any suitable process, in order to effect recovery of the magnesium or other salts. However, the particular type of process or apparatus which is employed to effect recovery of the magnesium salts is immaterial to the present invention.

One particular example of the process as above described is diagrammatically illustrated in the drawing which accompanies this application.

The reactions occurring in the process may be shown as follows:

In practice, the materials used are never 100% pure. For example, in the case of materials derived from the Carlsbad, New Mexico, deposits, langbeinite and potassium chloride concentrates may contain some sodium chloride and small percentages of magnesium chloride and sulphate. Also, it is not feasible to continue the reactions until the reactions are 100% complete, nor are manufacturing methods 100% efficient. Furthermore, it is desirable to recover as much K in the form of sulphate as possible instead of discarding it in the schoenite mother liquor. For these reasons, the finished product will not be 100% pure. When conditions are properly adjusted to give a product 90% pure, the yield is quite satisfactory.

Specific example

Although the process might be operated continuously, we find that good results have been obtained by the batch system of operation described herein. According to this preferred method of operation, langbeinite concentrate which has been previously washed or otherwise treated so that it is relatively free from common salt, and has been comminuted or ground to nominally 200 mesh size, is agitated in a reaction tank containing liquor previously derived from the final reaction. This hydration step may be carried on at various temperatures, the temperature employed determining whether the material formed is schoenite or leonite. The hydration, when carried out commercially at a temperature of from 100° F. to 140° F. on langbeinite ground to a nominal fineness of 200 mesh, requires from 6 hours to 2 hours.

As a result of this hydration in the first reaction tank, a slurry of schoenite or leonite crystals is produced in the mother liquor. This slurry is subjected to a separation or filtration step, which can be effected in any ordinary type of filter (preferably the centrifugal type) customarily used for extracting crystals from mother liquors. The filtrate or schoenite mother liquor may be discarded or subjected to a suitable treatment for recovery of the valuable salts contained therein.

The crystals of schoenite or leonite, depending on the temperature at which the hydration has been effected, are introduced into a tank containing the proper amount of a saturated solution of potassium chloride (KCl) concentrate, preferably with an excess of about 6% by weight of KCl, so as to form a slurry. The contents of the tank are agitated with any suitable stirring apparatus. This step of the process is carried out at a temperature of about 75° F. for 1 to 2 hours, or longer if necessary. The reaction results in the formation of a mother liquor containing potassium sulphate which comes down or precipitates as crystals and may be separated and recovered in any suitable type of filtering equipment, for example a continuous drum filter. The potassium sulphate mother liquor is sent to a storage tank and used for the hydration of a subsequent batch of langbeinite.

We claim:

The improvement in the art of making potassium sulphate, which consists in hydrating comminuted langbeinite, at a temperature of between 100° F. and 140° F. for from six to two hours, in potassium sulphate mother liquor to form crystals of hydrated $K_2SO_4MgSO_4$, separating the crystals from the liquor resulting from the hydration step, reacting said crystals in an aqueous medium containing KCl so as to form a precipitate of potassium sulphate in a mother liquor, separating the precipitate from the mother liquor, using the latter liquor for the hydration of a subsequent batch, and repeating the process.

JAMES A. BARR.
WILLIAM A. SMITH.

REFERENCES CITED

The following references are of record in the file of this patent:

UNITED STATES PATENTS

| Number | Name | Date |
|---|---|---|
| 2,295,257 | Butt et al. | Sept. 8, 1942 |

FOREIGN PATENTS

| Number | Country | Date |
|---|---|---|
| 2,173 | Germany | Sept. 25, 1877 |
| 4,933 | Germany | Apr. 19, 1878 |
| 313,053 | Germany | June 30, 1919 |
| 577,051 | Germany | May 22, 1933 |
| 593,293 | Germany | Mar. 9, 1934 |